US012031781B2

(12) United States Patent
Sumsion et al.

(10) Patent No.: US 12,031,781 B2
(45) Date of Patent: Jul. 9, 2024

(54) SYSTEM AND METHOD FOR CLEANING A TUBE BUNDLE OF A HEAT EXCHANGER CORE

(71) Applicant: Tube Tech Industrial Limited, Rayleigh (GB)

(72) Inventors: Derek Sumsion, Rayleigh (GB); Michael Watson, Rayleigh (GB); Jon Camp, Rayleigh (GB)

(73) Assignee: Tube Tech Industrial Ltd., Rayleigh (GB)

( * ) Notice: Subject to any disclaimer, the term of this patent is extended or adjusted under 35 U.S.C. 154(b) by 173 days.

(21) Appl. No.: 17/631,975

(22) PCT Filed: Jul. 21, 2020

(86) PCT No.: PCT/IB2020/056829
§ 371 (c)(1),
(2) Date: Feb. 1, 2022

(87) PCT Pub. No.: WO2021/019364
PCT Pub. Date: Feb. 4, 2021

(65) Prior Publication Data

US 2022/0276013 A1 Sep. 1, 2022

(30) Foreign Application Priority Data

Aug. 1, 2019 (GB) ..................................... 1911026

(51) Int. Cl.
*F28G 1/16* (2006.01)
*B08B 9/023* (2006.01)
(Continued)

(52) U.S. Cl.
CPC .............. *F28G 1/166* (2013.01); *B08B 9/023* (2013.01); *B08B 13/00* (2013.01); *F28G 15/003* (2013.01); *F28G 15/04* (2013.01); *B08B 2209/02* (2013.01)

(58) Field of Classification Search
CPC ................................ F28G 1/166; F28G 15/04
See application file for complete search history.

(56) References Cited

U.S. PATENT DOCUMENTS 5,836,268 A 11/1998 Wall
2008/0092924 A1 * 4/2008 Collin .................... F28G 1/166 134/22.12

(Continued)

FOREIGN PATENT DOCUMENTS

EP 0050632 A2 * 4/1982
EP 0569161 A2 11/1993
EP 2409107 8/2018

OTHER PUBLICATIONS

Machine translation: EP0050362; Campsen et al. (Year: 1982).*
(Continued)

*Primary Examiner* — Natasha N Campbell
(74) *Attorney, Agent, or Firm* — Allen, Dyer, Doppelt & Gilchrist, P.A.

(57) ABSTRACT

A system capable of autonomous operation is disclosed for cleaning a tube bundle of a heat exchanger core. The system comprises a lance for directing a jet of fluid into spaces between the tubes of the bundle, a carriage for advancing the lance into the bundle, a mount movable relative to the carriage for holding the lance, and a sensor for detecting relative movement between the lance and the carriage, so as to detect when a reaction force acting on the lance upon encountering an obstruction in the tube bundle exceeds a predetermined limit.

13 Claims, 6 Drawing Sheets

(51) Int. Cl.
*B08B 13/00* (2006.01)
*F28G 15/00* (2006.01)
*F28G 15/04* (2006.01)

(56) References Cited

U.S. PATENT DOCUMENTS

2010/0126540 A1 5/2010 Geppert et al.
2011/0030734 A1 2/2011 Marschall
2014/0222283 A1* 8/2014 Getman .................. F28G 15/04
134/56 R
2016/0025600 A1* 1/2016 Carlier ................ G01M 99/007
73/788

OTHER PUBLICATIONS

International Search Report and Written Opinion for PCT/IB2020/056829; European Patent Office; Oct. 27, 2020; entire document.

* cited by examiner

SYSTEM AND METHOD FOR CLEANING A TUBE BUNDLE OF A HEAT EXCHANGER CORE

CROSS-REFERENCE TO RELATED APPLICATIONS

This application is the § 371 National Stage Entry of International Application No. PCT/IB2020/056829, filed on Jul. 21, 2020, which claims the benefit of Great Britain Patent Application No. 1911026.1, filed on Aug. 1, 2019, the contents of which applications are herein incorporated by reference in their entirety.

FIELD OF THE INVENTION

The invention relates to a system and method for cleaning the core of a heat exchanger.

BACKGROUND OF THE INVENTION

Heat exchangers are used in a variety of different industries. The heat exchangers concerned with the present invention are liquid to liquid heat exchangers rather than liquid to air heat exchangers. A typical liquid to liquid heat exchanger comprises a shell and a core. The core has two end plates which define headers at the axial ends of the shell. A bundle of tubes is welded, expanded, or both expanded and then welded in holes in the two end plates to define fluid flow passages between the two headers. Baffle plates support the tubes along their length and maintain their spacing.

The shell is a tube of much larger diameter and encompasses the core. In use, a first fluid is pumped through the core tubes and a second fluid is pumped through the shell. The tubes are made of a good thermal conductor, so that a transfer of heat takes place between the two fluids during their passage through the heat exchanger.

The flow of fluids through the shell and the core can result in a build-up of deposits. This build-up leads to a reduction in the efficiency of the heat exchanger. It is therefore essential to clean the exterior of the tubes of the heat exchanger to remove such deposits.

The conventional method of removing deposits is to separate the shell from the core, and to then use a high-pressure jet of fluid (usually water) to dislodge the deposits by directing the tip of a lance between the tubes.

EP2409107 discloses a lance which is used for high pressure jetting of a heat exchanger core, the lance being of a thickness sufficiently small to fit between the tubes of the core. Conventionally, such a lance is handheld and positioned manually to penetrate between the tubes of the heat exchanger core but it is has also been proposed for such a lance to be supported and guided by a mechanical arm.

SUMMARY OF THE INVENTION

With a view to providing a cleaning system capable of autonomous operation, the present invention provides, in accordance with a first aspect, a system for cleaning a tube bundle of a heat exchanger core, comprising a lance for directing a jet of fluid into spaces between the tubes of the bundle, a carriage for advancing the lance into the bundle, a mount movable relative to the carriage for holding the lance, and a sensor for detecting relative movement between the lance and the carriage, so as to detect when a reaction force acting on the lance upon encountering an obstruction in the tube bundle exceeds a predetermined limit.

The ability of the system to detect when the lance encounters an obstruction allows data to be collected about the condition of the tube bundle and allows actions to be taken autonomously based on such data.

The system also affords the advantage over the prior art of being able to penetrate the tube bundle without manual control from an operator. This is because if the system were not sensitive to the presence of an obstruction, there would be significant risk of damaging the lance or the tube bundle.

The relative movement between the carriage and the lance may be achieved using at least two fixed members with a shaft extending therebetween and connected for movement with the carriage, and at least one slidable member connected for movement with the lance and slidable on the shaft. The movement of the slidable member may be biased forward by a spring with any reaction force on the lance acting against said spring. The spring stiffness may be chosen depending on multiple parameters to adjust the sensitivity of the system to a reaction force.

To prevent movement of the lance in a plane perpendicular to the lance, two flat stabilisers may be provided to straddle the lance, the stabilisers being capable of insertion between the tubes of the bundle to be cleaned.

The sensor used for detecting the reaction force may be a proximity sensor. The proximity sensor may be mounted to one of the slidable members and may sense its proximity to a road extending down the centre of the spring, the rod being attached for movement with one of the fixed members.

In some embodiments, the cleaning system may further comprise a computer system for receiving data from the lance, which data may include at least one of pressure emitted from the lance, number of attempts at clearing the obstruction, and time since the lance stopped advancing.

According to a second aspect of the invention, there is provided a method of cleaning a tube bundle of a heat exchanger, the method comprising: a) directing a jet of fluid from the lance into spaces between the tubes, b) advancing the lance, and c) upon sensing a reaction force exceeding a predetermined value, at least preventing further advance of the lance into the bundle.

In some embodiments, the lance may be retracted a set distance after detecting an excessive reaction force to minimise damage to the lance. The lance may then be advanced to clear the obstruction. The advancing and retracting steps may be repeated a pre-set number of times.

With an aim of allowing a client to receive documentation regarding the cleaning of their heat exchanger, a report may be generated to show data relating to the severity of any obstructions in the bundle. To aid ease of understanding, the report may include a graphical representation of the obstructions in the bundle.

BRIEF DESCRIPTION OF THE DRAWINGS

The invention will now be described further, by way of example, with reference to the accompanying drawings, in which.

DETAILED DESCRIPTION OF PREFERRED EMBODIMENTS

Overview of the Cleaning Apparatus

Figure 1:
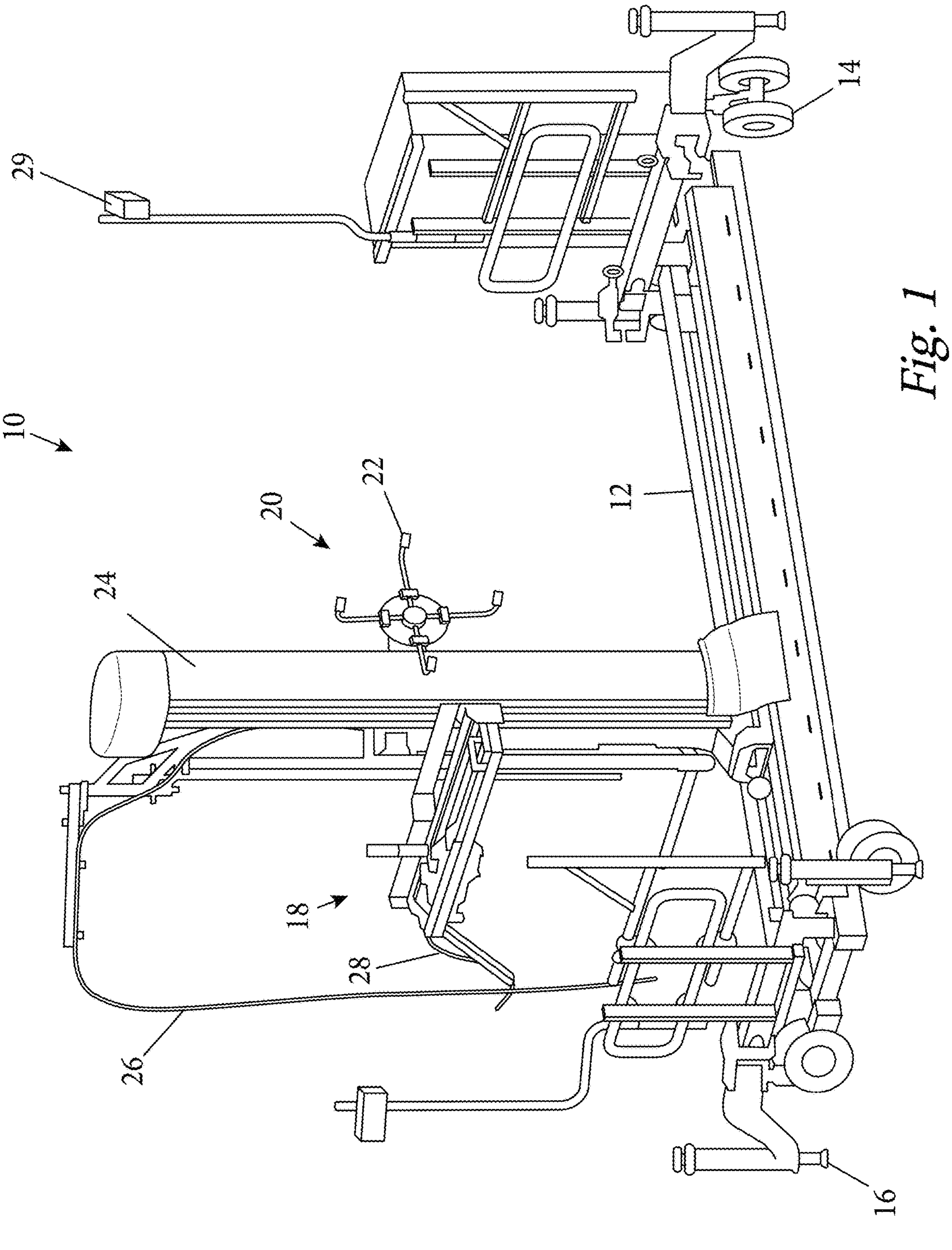
FIG. 1 is a perspective CAD drawing of a heat exchanger cleaning apparatus.
Figure 2:
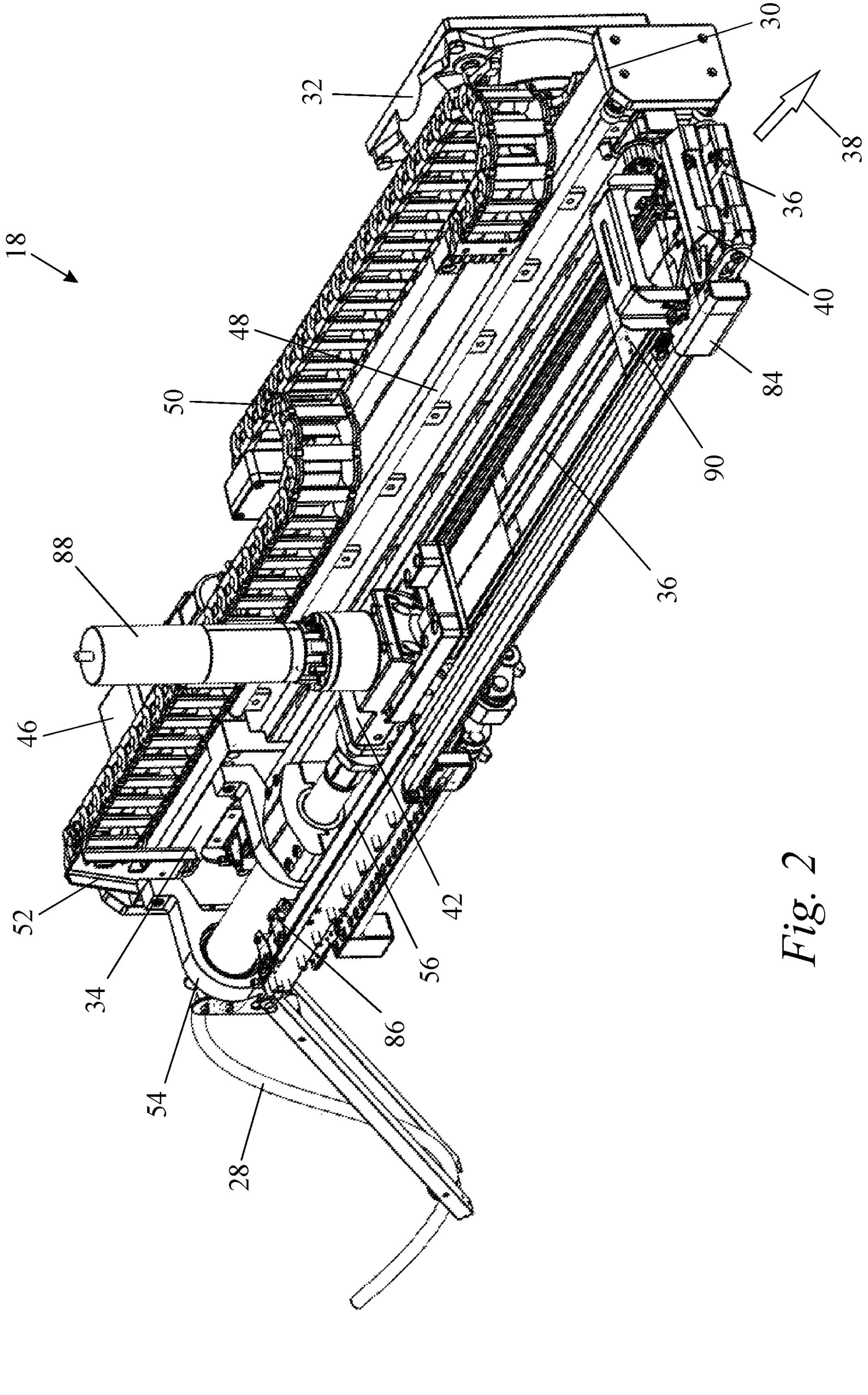
FIG. 2 is a perspective line drawing to an enlarged scale of the lance assembly of the cleaning apparatus shown in FIG. 1.
Figure 3:
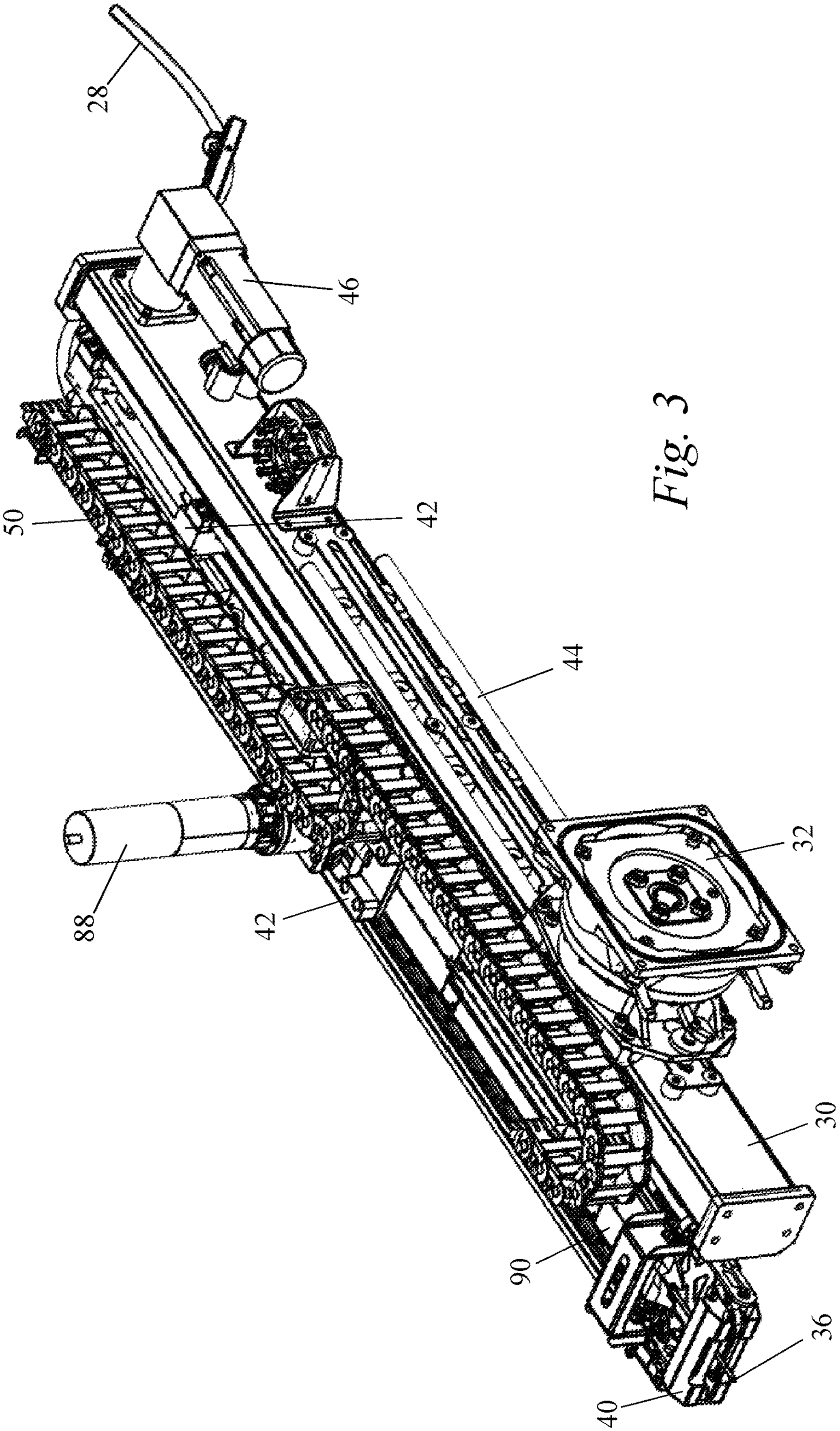
FIG. 3 is a perspective view of the lance assembly as seen from a different angle.
Figure 4:
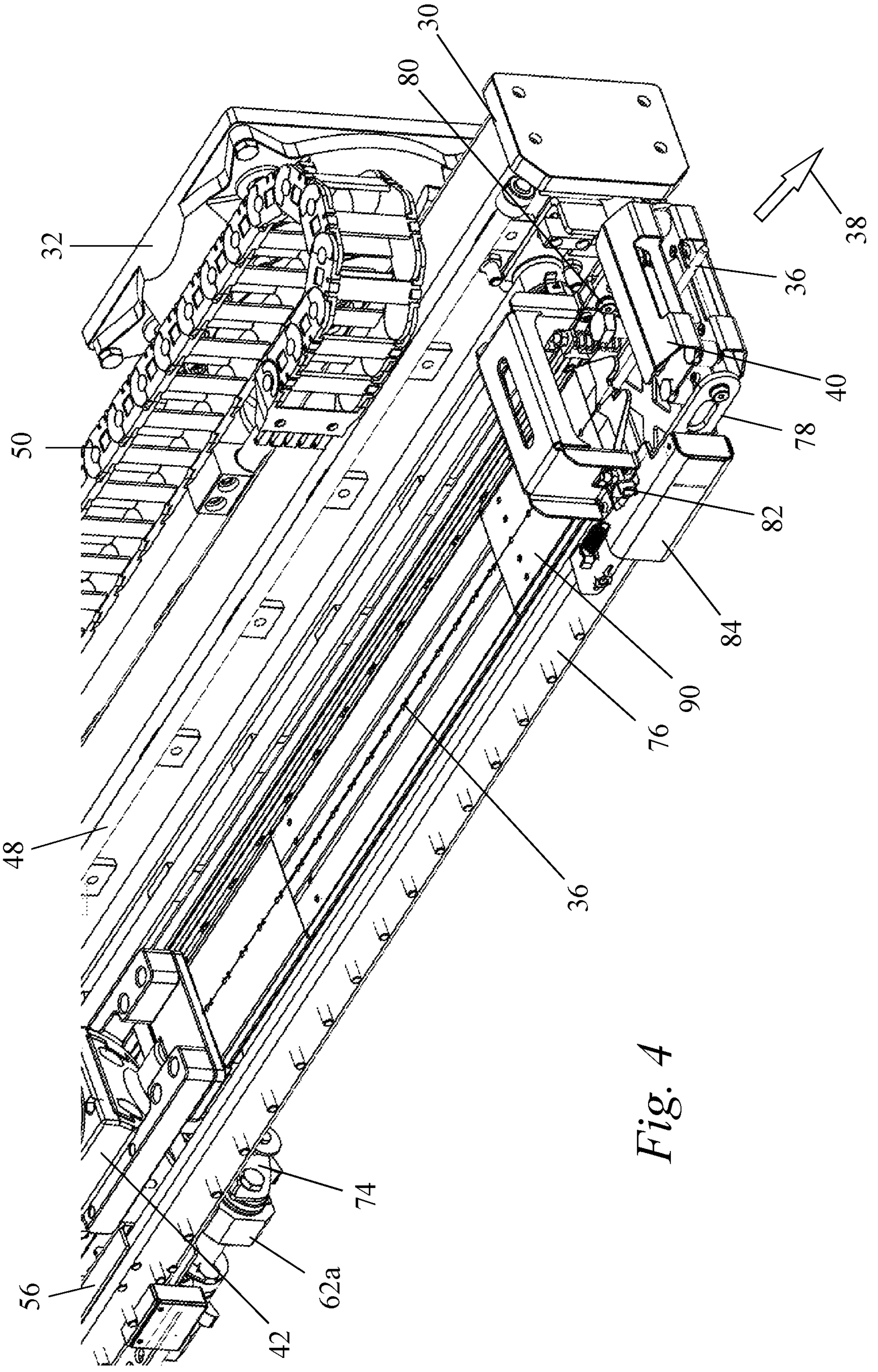
FIG. 4 is a perspective view of the front end of the lance assembly shown in FIG. 2, drawn to a further enlarged scale.
Figure 5:
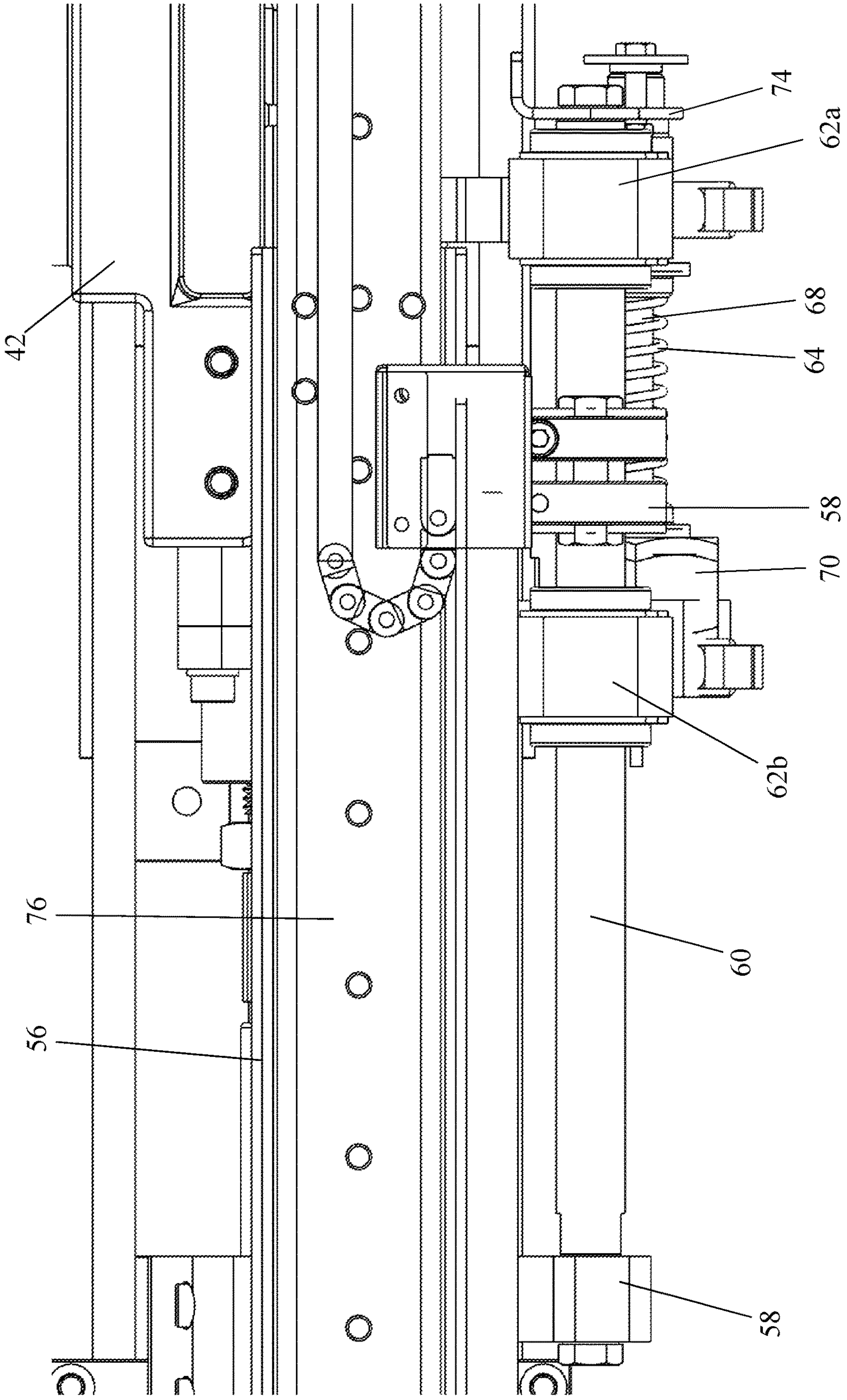
FIG. 5 is a side detail view of the lance assembly showing a backpressure sensing system.
Figure 6:
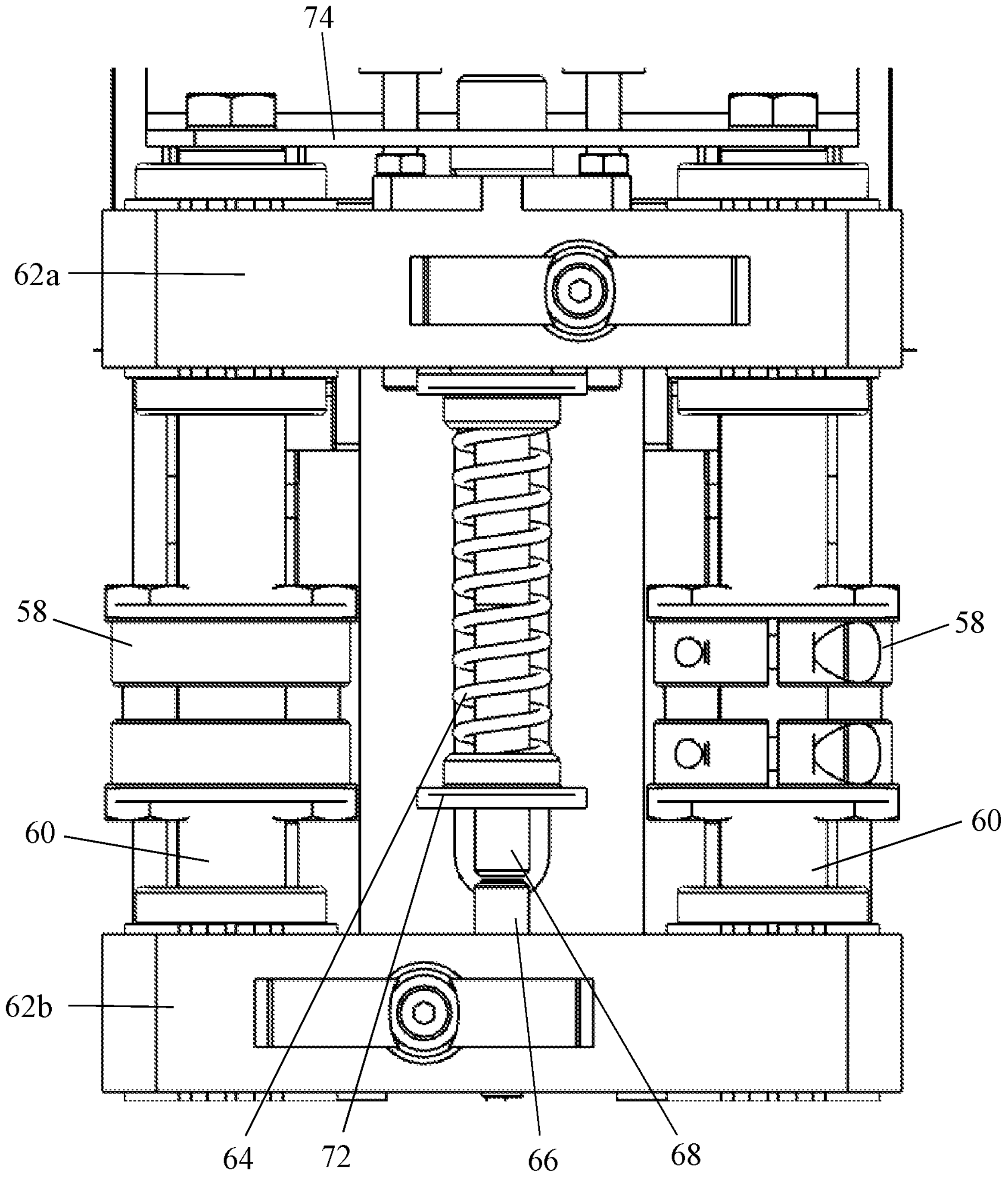
FIG. 6 is a bottom detail view showing the backpressure sensing system from a different angle.

FIG. 1 shows the general configuration of a heat exchanger cleaning apparatus 10. The apparatus 10 comprises a platform 12 having ground engaging wheels 14 to enable the platform 12 to be positioned alongside a heat exchanger tube bundle that is to be cleaned. The bundle, which is not shown in the drawing, is supported on a stand with the tubes lying horizontally and the stand may allow the bundle to be rotated. Once the platform 12 has been positioned alongside side the bundle, it is held stationary in a horizontal attitude by adjustable ground engaging feet 16.

The platform carries two jetting assemblies, generally designated 18 and 20, respectively, and its function is to allow the height of both of these assemblies above the ground to be adjusted and also to allow them both to be translated horizontally parallel to the tubes of the bundle. The first jetting assembly 18 is a lance assembly having a fluid jet emitting lance to be inserted between the tubes of the bundle to clean between the tubes. The second jetting assembly 20, referred to as a fan jet, has four nozzles 22 that rotate about a central axis and sprays jets of fluid onto the outer surface of the tube bundle.

The two jetting assemblies 18 and 20 are mounted for vertical sliding movement on opposite sides of a vertical column 24 and are moved in opposite directions by a toothed belt driven by a common motor. The column 24 is itself guided for horizontal movement relative to the platform 12 and it is moved by a motor driven pinion that engages with a rack on the platform 12. In this way, the two jetting assemblies can be moved along as well as up and down relative to the tube bundle, thereby allowing the bundle to be cleaned over its entire length.

The two jetting assemblies 18, 20 receive fluid (usually water) under high pressure from a pump via respective supply lines 28, 26. Cameras 29 mounted on the platform 12 allow the cleaning process to be monitored remotely and the supply lines 28, 26 include safety valves to cut off the high-pressure supply if, for example, danger to personnel or equipment is detected.

The present invention is concerned in particular with the lance assembly 18, the purpose of which is to clean automatically between the tubes of the bundle. To this end, the lance assembly is required to be able to determine the position of the outer surface of the bundle, to advance into the bundle when the region between the tubes has been cleaned and it is safe to do so, and to determine the degree of penetration of the lance into the bundle to ascertain when cleaning to a desired point has been achieved.

Forcing the lance forward when it is impeded can cause damage to the lance and possibly to the tube bundle. The lance should therefore not be advanced if the region of the tubes ahead of it has not been fully cleaned and still presents an obstruction.

Overview of the Lance Assembly

With a view to fulfilling all these objectives, the lance assembly of FIGS. 1 to 6 comprises a main chassis 30 that is secured to the column 24 by a gimbal mount 32.

A carriage 34 that supports the lance 36 is itself slidable along the main chassis 30 to advance the lance 36 in the direction of the arrow 38 into the tube bundle.

A pair of jaws 40 straddling the lance 36 are mounted for movement with the carriage 34 and the lance 36 and serve as a means of sensing the position of the outer surface of the tube bundle. The jaws are mounted on the end of two arms which retract against a spring bias when they abut the tube bundle. The retraction activates a switch and movement of the lance after operation of the switch serves to indicate the degree of penetration of the lance between the tubes of the bundle.

The lance 36 is secured to the carriage 34 by means of the mount 42, which is itself slidable relative to the carriage 34 and spring biased to urge the lance 36 forward. If the lance encounters an obstruction, the mount 42 moves backwards against the spring bias and in the process operates a switch, the signal from which is used to prevent forced advance of the lance.

Chassis

The chassis 30 comprises a box section of sufficient rigidity to withstand the forces imparted on the lance 36 during use. The box section has an end cap on each end in order to allow access to fixings and also to prevent pooling of fluid therein.

Rails 44 are fixedly mounted to the chassis 30 and allow for the chassis 30, and therefore the lance 36 to be slid relative to the gimbal mount 32 to a position ready for cleaning the tube bundle.

Both the attitude of the gimbal mount 32 and the position of the gimbal mount 32 relative to the chassis 30 are adjusted manually, and in combination with the vertical adjustment afforded by the vertical column 24, the lance assembly 18 as a whole can be positioned optimally relative to the tube bundle to be cleaned and can be used on a variety of tube bundle configurations.

A motor 46 is mounted to the chassis 30 and, via a toothed belt, drives the carriage 34 along a further set of rails 48 located on the opposite side of the chassis 30.

To prevent entanglement and damage of cables, a chain-linked cable guide 50 is provided on the top surface of the chassis and is mounted at one end to the carriage 34 via a bracket 52.

Carriage

The mount 42 is connected to the carriage 34 using a floating arrangement whereby bearing blocks 54 are fixed to the carriage 34 and transmit the forward drive of the carriage 34 to runners 56. Fixedly attached for movement with the runners 56 are fixed members 58, and a shaft 60 extending therebetween (see FIG. 5). Two slidable members, designated 62*a* and 62*b* can be slid along the shaft 60 and may therefore move relative to the runners 56 and the carriage 34. The mount 42 is coupled for movement with slidable members 62*a* and 62*b* by means of machine screws (not shown).

The above described mounting system permits the carriage 34 to be advanced with the mount 42 in instances where no reaction force is applied by the lance 36 to the mount 42 exists but allows relative movement between the carriage 34 and the mount 42 when a reaction force is applied. Such relative movement is opposed by a spring 64 which serves to bias the mount 42 forwards.

The spring 64 is mounted between the front slidable member 62*a* and a spring stop 72 which is fixed to a rod 68. The rod 68 extends through a hole in the front slidable member 62*a* to a fixed plate 74. The fixed plate is attached to the end of shafts 60.

The extent of the reaction force of the lance 36 is measured by a proximity sensor 66 (located under a cover 70, shown in FIG. 5, but removed in FIG. 6) mounted to the rear slidable member 62*b* sensing the distance between itself and the rod 68. As reaction force increases due to encountering an obstruction, the distance between the sensor 66 and the rod 68 increases. The spring stiffness is chosen based on the requirements of the client, the stubbornness of deposits on the tubes and the expected backpressure to be encountered.

Although the mounting system has been described with reference to a proximity sensor, it will be clear to the person skilled in the art that different types of sensors may be used, such as but not limited to, a contact switch, a pressure pad, a force sensitive resistor, a strain gauge, or a piezoelectric sensor.

Jaws

The purpose of the jaws 40 is to abut the outer surface of the tube bundle so the cleaning apparatus 10 may clean a tube bundle autonomously with minimal operator input. The jaws 40 may move in two directions; vertically, and also in the direction of the major axis of the lance 36.

First, they can move in the vertical direction by a small amount if the lance assembly is not in the exact required position or to allow for the bending of tubes in the bundle. To allow such a movement, the jaws 40 are connected to the arms 76 via fingers 78 (see FIG. 4). The fingers 78 are pivotable about mounting bolts 80 against a spring biased mechanism 82, partially hidden by cover 84, and the deflection is measured using sensors.

The second direction of movement is parallel to the movement of the lance 36 when penetrating the tube bundle to clean between the tubes. The arms 76 are movable relative to the runners 56 using tracks on each of their inner surfaces that offer sliding or rolling engagement. The sliding or rolling engagement is similar to that commonly found in kitchen drawers.

The arms 76, and therefore the jaws 40 are biased forward by linear springs 86 to force the jaws 40 to remain in contact with the tube bundle as the lance penetrates or retracts from said bundle. The term "linear spring" is used to relate to a spring constructed in manner similar to a steel tape measure, where the tape is wound back into its cylindrical housing with a nearly constant force independent of extension. The range of movement of the jaws 40 is from a fully extended state where the jaws 40 straddle the tip of the lance 36 as shown in the figures, to a fully retracted state where the jaws either touch or almost touch the mount 42.

Upon retraction of the jaws 40, a switch is activated which starts a measurement sensor, which may be in the form of a transducer, in order to determine the degree of penetration of the lance 36 into the tube bundle. Rather than activating a switch as soon as the jaws 40 begin retraction, the switch may instead be activated once a certain degree of penetration has occurred. This allows the output of the sensor to also be used to indicate that it is safe for fluid to be emitted from the lance 36.

Lance

The lance 36 is a cylindrical tube as is known in the art and, more specifically, in EP2409107. The lance 36 contains one or more holes toward its tip for emitting a fluid, at high pressure to clean tubes of a heat exchanger core, which comprises a tube bundle. The fluid is generally water but may, for example, include an abrasive to improve the cleaning capabilities of the apparatus 10.

The at least one hole may be positioned at the tip, or along the length of the lance 36. If positioned along the length of the lance 36, the holes may be orientated so as to emit fluid in any direction, i.e., projecting forwards towards the tip of the lance 36, backwards away from the tip of the lance 36, or in a direction orthogonal to the major axis of the lance 36. Where more than one hole is provided, each hole may be orientated in either the same or different direction.

The lance 36 may be rotated about its major axis to aid cleaning, and this may be achieved using an electric motor 88 mounted on the top of the mount 42. In the example shown in the figures, the motor 88 is mounted orthogonal to the major axis of the lance 36. The motor 88 rotates a first bevel gear which drives a second bevel gear, the second bevel gear mounted for rotation with the lance 36. The bevel gears are located within the mount 42 to protect them from debris and fluid.

It will be appreciated that whilst an electric motor is disclosed in the above paragraph, this is not limiting and is merely an example. It will be clear to the person skilled in the art that a pneumatic motor may be employed to achieve the desired outcome.

Due to the reaction forces of the fluid jets emitted from the lance 36 when cleaning stubborn material from the tube bundle, the lance 36 is prone to buckling or, as it is rotating, to precession. To prevent precession, the lance is straddled by two flat stabilisers 90 lying in a generally horizontal plane and sufficiently thin to be able to penetrate between the tubes of the bundle. The stabilisers 90 extend the majority of the length of the lance 36. Movement of the tip lance 36 in a vertical plane is inhibited by the jaws 40 and once the tip of the lance has penetrated between the tubes of the bundle by the tubes that have been cleaned.

Safety Valves

For the cleaning apparatus 10 to be able to run autonomously in a safe manner, at least one safety valve needs to be provided to cut off the high-pressure supply of fluid. In the present embodiment, there is an electronically controlled safety valve (not shown) linked to multiple sensors. The electronically controlled safety valve is activated by a foot pedal which is depressed by a 'foot' analogue which may be electronically, pneumatically or hydraulically controlled. The safety valve may be operated to cut-off the high-pressure supply in the following non-limiting scenarios: a) When the lance 36 has retracted from the tube bundle. This may be determined by the switch which activates the measurement sensor, b) If a malfunction in the system is detected, c) When an obstruction is detected, and d) If a door to an enclosure surrounding the apparatus 10 is opened, the door having a switch to detect whether it is open or closed.

The above are merely examples and it will be clear that many other parameters may be monitored and linked to the safety valve to reduce the risk associated with the autonomous cleaning apparatus 10.

A second safety valve may be employed to cut off the high-pressure supply of fluid to the lance 36, the safety valve being operated using a user operated pedal (not shown). The configuration of the pedal is such that pressure may only be supplied to the lance 36 when the pedal is depressed, meaning that the cleaning system can only be operated when the apparatus operators are in a safe location, such as from within a control box or behind a safety barrier. If the operator notices anything unsafe such as a person walking towards the apparatus 10, the pedal allows the operator to override the system and stop the supply of fluid. The configuration of the pedal allows the operator to simply take their foot off the pedal to stop the system.

The second safety valve, operated manually by the operator and situated in-line and upstream of the first valve, is the master switch. That is to say that no matter the status of the first valve, it is not possible for full working pressure to be achieved without the pedal operating the second valve being depressed.

Method of Use

Before fluid flow commences, the apparatus 10 must be set up. The apparatus is rolled to a position that platform 12 lies parallel to the tube bundle and then held in place and supported by the feet 16. The lance assembly 18 is positioned at the height of the centre of the tube bundle, i.e., the height at which the most penetration is required during cleaning. The chassis 30 is then moved manually forward in the direction of the arrow 38 to a point before the end caps of the chassis 30 lie next to the outer surface of the tube bundle. The chassis 30 is clamped in place and the gimbal mount 32 adjusted for optimum cleaning.

The lance assembly 18 is then raised or lowered to a point just above or below the tube bundle. Using the motor 46, the lance 36 is then advanced to a point past the centre of the bundle, this setting the desired maximum penetration into the bundle. There is no advantage to advancing the lance 36 further than this as the bundle can be rotated and cleaned from the other side. Furthermore, if the bundle is split in half longitudinally, passing the centre of the bundle will cause fluid emitted from the lance 36 to be sprayed at nearby equipment and operators, presenting a safety risk due to the very high pressure at which the lance 36 emits fluid.

The advancing distance is measured by a transducer and is logged into the cleaning system, and acts as a limit to which the lance 36 can advance. The lance is then fully retracted to its starting position.

Once the above setup steps have been complete, the lance assembly is lowered to the gap between the first rows of tubes where cleaning is to be commenced.

The carriage 34 and lance 36 are advanced towards the outer surface of the tube bundle. During this phase, the jaws 40 will contact the outer surface of the bundle and come to a stop. The switch displaced by the arms 76 will indicate that the tip of the lance 36 is about to commence penetrating between the tubes of the bundle and measurement of its advance is commenced.

As the carriage 34 is driven forward, the lance 36 will move relative to the arms 76 and penetrate the bundle, this penetration being measured by the penetration measuring transducer. Such a measuring device may be in the form of a rotary encoder and may, for example, be mounted to the shaft of the motor 46 which advances the lance 36. Alternatively, a linear encoder or any other device capable of measuring the movement of the lance 36 relative to the arms 76 may be employed.

Upon a pre-set degree of penetration, a switch or sensor will output a signal allowing the first safety valve to permit high-pressure fluid to be emitted from the lance, providing that the second safety valve is also permitting passage of fluid.

The lance 36 continues to advance until it either reaches the limit point set in an earlier step, or the backpressure sensor 66 detects that excessive resistance if being encountered by lance 36. If a large reaction force is applied by the lance 36 to the mount 42, the sensor 66 prevents the motor 46 from advancing the carriage 34. Depending on the settings, the lance 36 may be held still for a set period of time in the hope that the obstruction will be cleared, or it may move forwards and backwards a set number of times, known in the art as pecking, to try to clear the obstruction. Obstructions may be in the form of deposits or may be structural supports for the bundle. If re-programmed to do so, the electronically controlled safety valve can stop the flow of fluid after a set time or number of pecks to reduce damage to the lance 36 and allow the operator to investigate the problem further.

Once the lance 36 reaches the limit point, the lance may return to its initial position while still emitting fluid at full working pressure to clean the tubes further with a second pass.

As the lance is being retracted, the safety valve operating switch is again triggered and the electronically controlled safety valve reduces the pressure to the lance. The jaws 40 remain in contact with the outer surface of the tube bundle at this stage due to the forward biasing linear springs 86.

The lance 36 is then fully retracted from the tube bundle to its starting position where the jaws 40 are no longer in contact the tube bundle and the tip of the lance 36 is clear of the tubes.

The lance assembly 18 is then moved horizontally along platform 12 a set amount to advance into the bundle once again. After the lance has traversed the full length of the tube bundle, the lance assembly is lowered on vertical column 24 to clean a different gap.

The cleaning apparatus 10 is connected to a computer system (not shown), the computer system being able to receive data from the lance 36 and the sensor 66. The type of information that the computer system may receive includes; fluid pressure, reaction force measured by the sensor 66, the number of attempts at clearing the current obstruction, and time passed since the lance 36 stopped advancing.

The computer system may use the received information to generate a report indicating the severity of some obstructions. Optionally, the report may include a diagram or three-dimensional representation of the bundle showing the obstructions in an easy to understand format such as a heat map.

It will be appreciated that the above description are merely embodiments of the invention, and that any minor adaptation to the embodiments described above are intended to fall within the scope of the claims.

For example, although foot operated pedals are used in the described embodiment for actuation of the safety valves, other methods of activation could be used as a switch or pressure sensor in the system operator's seat or a button or lever Similarly, any mention of a spring in the above description includes the use of not just a coil spring, but any member or system having the appropriate qualities to act as a spring. Once such example may be a pressurized gas or a rubber rod.

The invention claimed is:

1. A system for cleaning a tube bundle of a heat exchanger core, the system comprising:

a lance for directing a jet of fluid into spaces between the tubes of the bundle in a direction transverse to the tubes of the bundle, a carriage for advancing the lance into the bundle, a mount movable relative to the carriage for holding the lance, a spring acting on the mount to urge the lance towards the tube bundle, and a sensor for detecting relative movement between the lance and the carriage, so as to detect when a reaction force acting on the lance upon encountering an obstruction in the tube bundle exceeds a predetermined limit, at least two fixed members with a shaft extending therebetween and connected for movement with the carriage, and at least one slidable member connected for movement with the lance and slidable on the shaft, wherein the relative movement between the lance and the carriage is achieved by the at least one slidable member traversing the shaft.

2. The system as claimed in claim 1, wherein two flat stabilisers straddle the lance, the stabilisers being capable of insertion between the tubes of the bundle to be cleaned.

3. The system as claimed in claim 1, wherein the sensor used for detecting the reaction force is a proximity sensor.

4. The system as claimed in claim 3 wherein the system further comprises:

at least two fixed members with a shaft extending therebetween and connected for movement with the carriage, and at least one slidable member connected for movement with the lance and slidable on the shaft, wherein the relative movement between the lance and the carriage is achieved by the at least one slidable member traversing the shaft, and wherein the sensor is mounted to one of the at least one slidable members and senses its proximity to a rod in axial alignment with the sensor.

5. The system as claimed in claim 1, further comprising a computer system for receiving data indicative of the lance encountering an obstruction.

6. The system as claimed in claim 5, wherein the data includes at least one of the reaction force on the lance, number of attempts at clearing the obstruction, and time since the lance stopped advancing.

7. A method of cleaning a tube bundle of a heat exchanger using the system of claim 1, the method comprising:

directing the jet of fluid from the lance into spaces between the tubes, advancing the lance in the direction transverse to the tubes of the bundle, and upon sensing the reaction force exceeding the predetermined limit, at least preventing further advance of the lance into the bundle.

8. The method as claimed in claim 7, further comprising the step of retracting the lance a pre-set distance once an excessive reaction force is sensed.

9. The method as claimed in claim 8, further comprising the step of again advancing the lance to dislodge the obstruction.

10. The method as claimed in claim 9, wherein the action of retracting and advancing the lance is repeated a pre-set number of times.

11. The method as claimed in claim 7, wherein a report is generated based on the severity of any obstructions in the bundle.

12. The method as claimed in claim 11, wherein the report includes a graphical representation of the obstructions and their severity throughout the bundle.

13. A system for cleaning a tube bundle of a heat exchanger core, the system comprising:

a lance for directing a jet of fluid into spaces between the tubes of the bundle in a direction transverse to the tubes of the bundle, a carriage for advancing the lance into the bundle, a mount movable relative to the carriage for holding the lance, a spring acting on the mount to urge the lance towards the tube bundle, a sensor for detecting relative movement between the lance and the carriage, so as to detect when a reaction force acting on the lance upon encountering an obstruction in the tube bundle exceeds a predetermined limit, at least two fixed members with a shaft extending therebetween and connected for movement with the carriage, and at least one slidable member connected for movement with the lance and slidable on the shaft, wherein the relative movement between the lance and the carriage is achieved by the at least one slidable member traversing the shaft, wherein the sensor is mounted to one of the at least one slidable members and senses its proximity to a rod in axial alignment with the sensor, and wherein the sensor used for detecting the reaction force is a proximity sensor.

* * * * *